United States Patent [19]

Hemmi

[11] 4,453,299

[45] Jun. 12, 1984

[54] CONTROLLED DEFLECTION ROLL

[75] Inventor: Rolander Hemmi, Richterswil, Switzerland

[73] Assignee: Escher Wyss Aktiengesellschaft, Zürich, Switzerland

[21] Appl. No.: 383,103

[22] Filed: May 28, 1982

[30] Foreign Application Priority Data

Jun. 17, 1981 [CH] Switzerland ........................ 3980/81

[51] Int. Cl.³ ............................................ B21B 13/02
[52] U.S. Cl. ............................................ 29/116 AD
[58] Field of Search ...... 29/116 AD, 113 AD, 116 R; 100/162 B, 171

[56] References Cited

U.S. PATENT DOCUMENTS 3,994,367 11/1976 Christ ........................ 29/116 AD X
4,069,569 1/1978 Meckel et al. ................ 29/116 AD Primary Examiner—Carl E. Hall
Assistant Examiner—John T. Burtch
Attorney, Agent, or Firm—Werner W. Kleeman

[57] ABSTRACT

A controlled deflection roll wherein the individual pressure or support elements thereof have operatively correlated thereto springs which act in addition to the pressure force exerted by the pressure or support elements. At the same time there are provided external pressing or contact devices which exert a predetermined pressing or contact force. These pressing devices, in the work position of the controlled deflection roll, bring about a force equilibrium in conjunction with the pressure or support elements and the springs.

8 Claims, 4 Drawing Figures

CONTROLLED DEFLECTION ROLL

BACKGROUND OF THE INVENTION

The present invention relates to a new and improved construction of a controlled deflection roll which is of the type containing a substantially tubular-shaped roll shell which is rotatable about a stationary roll support or beam, the roll shell being supported at the roll support or beam by pressure or support elements.

A controlled deflection roll of this type is known to the art, for instance, from U.S. Pat. No. 3,802,044, granted April 9, 1974, and U.S. Pat. No. 3,885,283, granted May 27, 1975. The controlled deflection roll disclosed in the last-mentioned U.S. Pat. No. 3,885,283 enables accomplishing pressing or contact movements by the action of the pressure or support elements, so that there is not required an external pressing or contact mechanism.

However, situations are encountered in practical applications, such as for instance in printing machines, where such type of rolls must be lifted-off and then again brought into their work or operative position. In such case there were heretofore required specially designed advance or feed mechanisms having a fixed work position. These advance or feed mechanisms are however relatively complicated in their construction and design.

Also, it is here mentioned that controlled deflection rolls having springs acting upon the support elements, but not equipped with pressing or contact devices are known to the art from U.S. Pat. No. 3,994,367, granted Nov. 30, 1976.

SUMMARY OF THE INVENTION

Therefore, with the foregoing in mind it is a primary object of the present invention to provide a new and improved construction of a controlled deflection roll of the aforementioned type which, instead of using an advance or feed mechanism, is capable of working with simple pressing or contact devices which exert a predetermined pressing or contact force, for instance pneumatic or hydraulic cylinder units, which are capable of acting upon the journals of the controlled deflection roll or a counter roll.

Now in order to implement this object and others, which will become more readily apparent as the description proceeds, the controlled deflection roll of the present development is manifested by the features that, springs are provided for the support or pressure elements, these springs, being effective in the direction of the pressing of the support elements force and in addition thereto. There are also provided external pressing or contact devices which serve for pressing the controlled deflection roll against a counter roll with a predetermined pressing or contact force. The forces of the pressing devices, the support elements and the springs are chosen such that with a predetermined contemplated pressing force there prevails an equilibrium condition, wherein, while taking into account the therewith associated bending-through or sag of the roll beam or support and/or the roll shell, the springs produce a desired pressing force profile which is superimposed upon the pressing force of the support or pressure elements.

The springs, which are operatively associated with the support elements, consequently have an ascending characteristic of the forces effective between the roll support or beam and the roll shell. Hence, there can be employed simple pressing or contact devices, for instance piston-and-cylinder units,—briefly referred to herein as simply cylinder units—which can be actuated pneumatically or also hydraulically. There are not needed positioning devices for the exact adjustment of the position of the journals of the roll support in the work position.

Preferably, the controlled deflection roll can contain a roll shell which is movable in the pressing direction in relation to the roll support or beam along its entire length within a certain degree of play, and for the predetermined contemplated or layout pressing or contact force the roll shell is located within such degree of play. A controlled deflection roll having such type of guided roll shell is known to the art from the aforementioned U.S. Pat. No. 3,885,283. Due to the employment of such type of controlled deflection roll for the inventive measures there is avoided the additional effect or influence of rotatable bearings at the ends of the roll shell.

However, it should be understood that there also can be used a controlled deflection roll possessing a roll shell rotatably mounted at the roll support or beam and without the aforementioned mobility, as such is known, for instance, from the likewise previously mentioned U.S. Pat. No. 3,802,044. Under circumstances there can be obtained special effects by the forces effective at the bearing located at the ends of the roll shell.

According to a particularly simple case, the springs or spring members of the support or pressure elements can be dimensioned such and their arrangement chosen such that the springs, for the predetermined contemplated pressing force and the bending-through or sag of the roll support and/or the roll shell corresponding to such predetermined contemplated pressing force, all exert the same forces. This simplified construction is particularly advantageous in the case of controlled deflection rolls having bending-slack roll shells formed of rubber or a similar material which, for instance, are used in printing machines. Such type of bending-slack or elastomeric roll shells are known to the art from U.S. Pat. No. 4,069,569, granted Jan. 24, 1978.

A further simplification in the system design can also be obtained in that, all of the springs of the support or pressure elements are similarly constructed, and that at least a portion of the springs are supported upon spacer or distance elements which take into account the bending-through of the roll support and/or the roll shell at the location of the related support element for the predetermined contemplated or layout pressing force.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
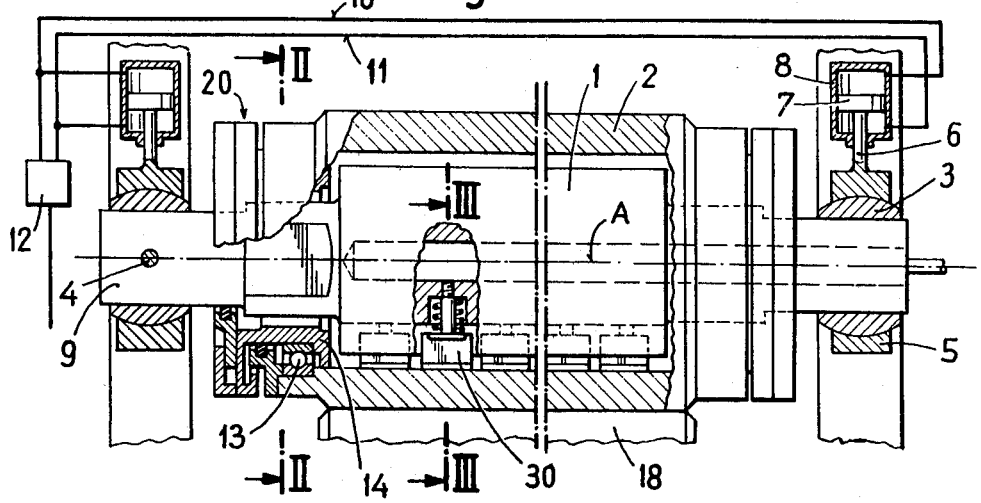
FIG. 1 is a schematic front view, partially in section, of a controlled deflection roll constructed according to the invention.

Describing now the drawings, it is to be understood that only enough of the construction of the controlled deflection roll has been illustrated to enable those skilled in the art to readily understand the underlying principles and concepts of the present development, while simplifying the showing of the drawings. Turning attention now specifically to FIG. 1, there is depicted therein a controlled deflection roll which is of the type containing a stationary roll support or beam 1 and a roll shell 2 which is appropriately mounted to be rotatable about the roll support or beam 1. In particular, this roll support or beam 1 is provided with journals 9 which are mounted by means of ball or spherical bearings 3 or equivalent structure in the slide members or slides 5, however secured against rotation by pins 4 or other suitable anti-rotation means in such slides 5. These slides or slide members 5 are operatively connected by the piston rods 6 with the pistons 7 which can reciprocate within the cylinders 8. The not particularly referenced pressure chambers or compartments of the cylinders 8 can be flow connected in conventional manner by means of the lines or conduits 10 and 11 and a control device 12 with a not particularly illustrated but suitable source of pressurised fluid medium which is at a controlled or regulated pressure. Pressing or contact devices constituted by the pistons 7 and cylinders 8 are known to the art, for instance, from U.S. Pat. No. 4,222,324, granted Sept. 16, 1980.

Figure 2:
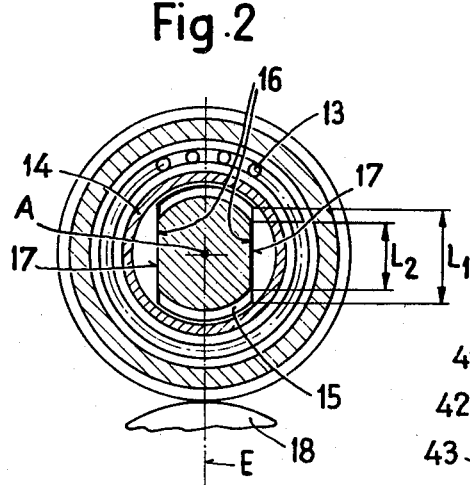
FIG. 2 is a cross-sectional view of the controlled deflection roll depicted in FIG. 1, taken substantially along the section line II—II thereof.

The ends of the roll shell 2 are mounted upon bushing or sleeve members 14 or equivalent structure with the aid of roller bearings 13 or other suitable anti-friction bearing means. As best seen by referring to FIG. 2, each of the bushings 14 possesses an elongate opening 15 having substantially planar or flat guide surfaces 16. Each bushing or sleeve member 14 is guided at its guide surfaces 16 along likewise substantially planar or flat surfaces 17 which are formed at the ends of the roll support 1 as is well known in this technology. As also will be seen by reverting to FIG. 2, each bushing or sleeve member 14 possesses a certain clearance or freedom of play in relation to the roll support 1 in the direction of the pressing or contact plane E, this clearance or play being formed by the difference of the lengths $L_1$ and $L_2$ of the coacting surfaces 16 and 17. The pressing plane E extends through the lengthwise axes of the roll support 1 and a counter roll 18 coacting with the controlled deflection roll.

As will be seen from FIG. 1, the controlled deflection roll is provided at each of its opposed ends with a related closure arrangement or cover means 20 which is constructed in conventional manner and sealingly closes the opposite ends of the roll shell 2 in relation to the roll support 1.

Figure 3:
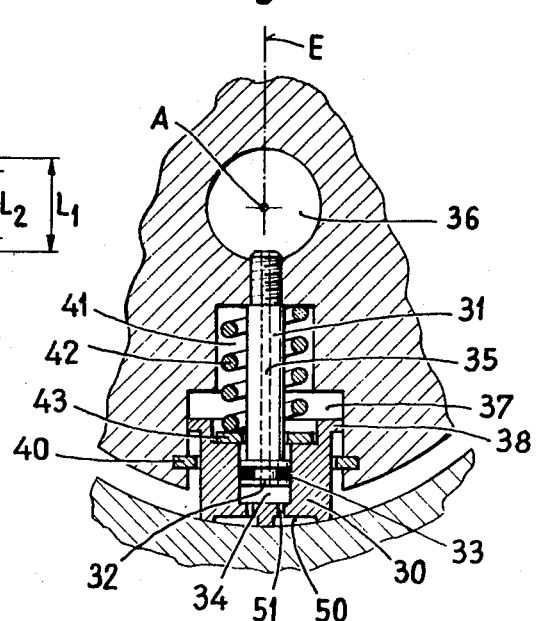
FIG. 3 is a fragmentary sectional view of the arrangement of FIG. 1, shown on an enlarged scale, and taken substantially along the section line III—III thereof.

As also will be evident by inspecting FIGS. 1 and 3, substantially punch or piston-like support or pressure elements 30 are located between the roll support or beam 1 and the roll shell 2. Such support elements 30 are arranged in the pressing or contact plane E. These support elements 30 are guided upon pins or plugs 31 or equivalent structure which possess piston-like ends 32 containing sealing rings 33. Each piston-like end 32 is sealingly guided in a bore 34 of the related support or pressure element 30. A bore 35 of the pin or plug member 31 allows for the infeed of a suitable pressurised fluid medium, typically a hydraulic pressurised fluid medium, such as oil for instance, from a central bore 36 of the roll support 1 into the bore 34 of the related support or pressure element 30.

With the exemplary embodiment of controlled deflection roll depicted in FIGS. 1 and 3, the support elements 30 are arranged in a row in an elongate or lengthwise extending recess or cutout 37 of the roll support or beam 1 and are provided with laterally protruding tabs or flap members 38 by means of which they are guided in the recess 37. These flap members 38 simultaneously coact with impact or stop elements 40 which prevent movement of the support elements 30 out of the recess or cutout 37.

As also will be recognised by inspecting FIGS. 1 and 3, each support or pressure element 30 has operatively associated or correlated therewith a bore 41 provided in the roll support or beam 1. Engaging into each such bore 41 is a resilient element in the form of a spring member 42, here shown as a helical spring, which bears by means of a spacer element or disc 43 upon the corresponding support or pressure element 30.

Figure 4:
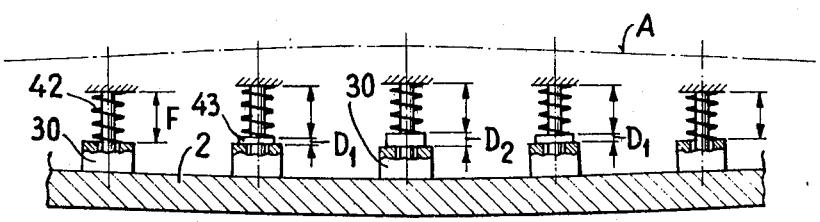
FIG. 4 is a schematic illustration corresponding to the showing of the controlled deflection roll depicted in FIG. 1 and serving to explain the dimensioning of the spacer elements for the individual springs.

FIG. 4 schematically shows the condition of the roll support 1 and the roll shell 2 in the event of a bending-through or deflection of the controlled deflection roll by virtue of a predetermined contemplated or layout pressing force for which there have been dimensioned the springs 42 and the spacer elements 43. In FIG. 4 there has been illustrated the bending-through or deflection of the roll support or beam 1 by a correspondingly curved axis A. The roll shell 2, in turn, is bent or curved in the opposite sense in accordance with the yieldability of the counter roll 18 and its inherent rigidity. If, as explained, there are used for all of the support or pressure elements 30 the same spring members or springs 42, then the springs 42 also have the same length F. The difference between the bending-through lines of the axis A and the roll shell 2, upon which move the support or pressure elements 30, is compensated for by the provision of different thicknesses D1 and D2 of the spacer elements or discs 43. The springs 42 of the support elements 30 located at the ends of the roll shell 2 are devoid of any spacer elements or discs in the illustrated exemplary embodiment.

In FIG. 3 there has been illustrated a support element 30 which is provided, as taught in the aforementioned U.S. Pat. No. 3,802,044 with hydrostatic bearing pockets 50 which are connected by throttle bores 51 with the bore 34. The construction and mode of operation of such type of bearing pockets 50 has been described in detail in such U.S. Pat. No. 3,802,044. However, it should be understood that there also can be employed different types of support or pressure elements, for instance containing hydrodynamic lubrication of their running surfaces at the roll shell or even equipped with rolls which roll upon the roll shell.

If a pressurised fluid medium, for instance compressed air at a predetermined regulated pressure, is infed through the pressure line 10 to the cylinders 8, with simultaneous infeed of a hydraulic pressurised fluid medium through the central bore 36 into the cylinder chambers or bores 34 of the support or pressure elements 30, then, as already explained, the controlled deflection roll is pressed by means of its roll shell 2 towards the counter roll 18. If the pressure in the line or conduit 10 is chosen such that it corresponds to the selected predetermined contemplated pressing force, then there prevail the conditions which have been described previously in conjunction with FIG. 4. With the aid of the support elements 30 and the springs 42 there is obtained a desired force profile or configuration which is effective at the pressing nip or gap between the roll shell 2 and the counter roll 18. However, it should be understood that it is possible to also work with other pressing or contact forces than the predetermined contemplated pressing force, in which case then there can be obtained for a given design of the springs other force profiles or configurations.

In many instances, especially with the previously discussed printing machines, where there do not arise particularly great pressing forces, the bending-through or sag of the counter roll is negligible. In such instances the bending-through of the roll shell can be neglected in dimensioning the springs 42 and the spacer discs or elements 43.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A controlled deflection roll comprising:
   a stationary roll support;
   a substantially tubular-shaped roll shell mounted to be rotatable about said stationary roll support;
   support elements for supporting the roll shell at the roll support with a substantially identical hydraulic force acting on the support elements;
   means for generating said hydraulic force acting upon said support elements;
   spring means provided for the support elements for exerting forces thereat;
   said spring means being effective in the direction of the hydraulic force exerted upon the support elements and in addition thereto;
   external pressing devices for pressing the controlled deflection roll against a counter roll in a pressing direction with a predetermined pressing force; and
   the forces of the external pressing devices, the support elements and the spring means being selected such that for a predetermined contemplated pressing force there prevails an equilibrium condition and, while taking into account the therewith associated deflection of the roll support and the roll shell, the spring means produce a desired pressing force profile which is superimposed upon the hydraulic force exerted upon the support elements.

2. The controlled deflection roll as defined in claim 1, wherein:
   said roll shell is structured such that it can move in relation to the roll support in the pressing direction along its entire length within an area of play; and
   the roll shell is located within such area of play in the presence of the layout pressing force.

3. The controlled deflection roll as defined in claim 1, further including:
   means for rotatably mounting opposed ends of said tubular-shaped roll shell at said roll support.

4. The controlled deflection roll as defined in claim 1, wherein:
   said tubular-shaped roll shell comprises a substantially bending-slack roll shell.

5. The controlled deflection roll as defined in claim 1 or 2, wherein:
   said spring means of the support elements are dimensioned and arranged such that the spring means, in the presence of the predetermined contemplated pressing force and the deflection of the roll support corresponding to such predetermined contemplated pressing force, all exert essentially the same forces.

6. The controlled deflection roll as defined in claim 1, wherein:
   all of the spring means of the support elements possess the same construction;
   spacer elements for supporting at least a portion of the spring means; and
   said spacer elements taking into account the deflection of the roll support at the location of the related support element in the presence of the predetermined contemplated pressing force.

7. The controlled deflection roll as defined in claim 5, wherein:
   said spring means of the support elements are dimensioned and arranged such that the spring means, in the additional presence of a deflection of the roll shell, all exert essentially the same forces.

8. The controlled deflection roll as defined in claim 6, wherein:
   said spacer elements additionally take into account the deflection of the roll shell at the location of the related support element.

* * * * *